United States Patent [19]

Floch et al.

[11] Patent Number: 5,418,467
[45] Date of Patent: May 23, 1995

[54] APPARATUS AND METHOD OF CHECKING THE THICKNESS AND UNIFORMITY OF A COATING DEPOSITED ON AN ELONGATED INSULATING BODY USING A CONDENSER SENSOR AS PART OF A RESONANT ELECTRICAL CIRCUIT

[75] Inventors: Bernard Floch, Chaumont En Vexin; Patrick MacKenzie, Paris, both of France

[73] Assignee: Alcatel Fibres Optiques, Bezons Cedex, France

[21] Appl. No.: 82,446

[22] Filed: Jun. 25, 1993

[30] Foreign Application Priority Data

Jun. 30, 1992 [FR] France .................... 9208031

[51] Int. Cl.⁶ .................................. G01R 27/26
[52] U.S. Cl. .................... 324/671; 324/675
[58] Field of Search ............ 324/652, 655, 663, 671, 324/675, 682, 686

[56] References Cited

U.S. PATENT DOCUMENTS

| | | | |
|---|---|---|---|
| 3,748,577 | 7/1973 | Jones | 324/671 |
| 3,801,900 | 4/1974 | Szasz | 324/671 |
| 3,812,424 | 5/1974 | Abbe | 324/688 |
| 4,706,014 | 11/1987 | Fabbri | 324/671 X |
| 5,198,777 | 3/1993 | Masuda et al. | 324/671 |
| 5,231,359 | 7/1993 | Masuda et al. | 324/675 |
| 5,241,280 | 8/1993 | Aidun et al. | 324/671 |

FOREIGN PATENT DOCUMENTS

| | | |
|---|---|---|
| 0395253 | 10/1990 | European Pat. Off. . |
| 0406860 | 1/1991 | European Pat. Off. . |
| 0459441 | 12/1991 | European Pat. Off. . |
| 2036642 | 12/1970 | France . |
| 1813333 | 6/1970 | Germany . |

OTHER PUBLICATIONS

Measurement Techniques, vol. 32, No. 7, Jul. 1989, New York, US, pp. 647–649, V. K. Fedotov: "capacitance thickness gauge for conducting films".

*Primary Examiner*—Kenneth A. Wieder
*Assistant Examiner*—Glenn W. Brown
*Attorney, Agent, or Firm*—Sughrue, Mion, Zinn, Macpeak & Seas

[57] ABSTRACT

This invention concerns an apparatus for checking the thickness and uniformity of a coating made of conducting material deposited on an elongated insulating body, this apparatus comprising:
- a sensor sensitive to the presence of the elongated body and forming part of an electrical circuit powered by a power supply voltage (24),
- measurement instruments (25) to measure an electrical quantity that is a function of the thickness of the conducting coating, at the output of the circuit
- equipment for processing the electrical quantity to deduce the thickness of the conducting coating, wherein the sensor consists of a condenser (10) containing two plates separated from each other by an air gap containing a dielectric material, this condenser being adapted to enable the elongated body to pass through the air gap.

22 Claims, 5 Drawing Sheets

FIG. 7

APPARATUS AND METHOD OF CHECKING THE THICKNESS AND UNIFORMITY OF A COATING DEPOSITED ON AN ELONGATED INSULATING BODY USING A CONDENSER SENSOR AS PART OF A RESONANT ELECTRICAL CIRCUIT

This invention concerns an apparatus and method of checking the thickness and uniformity of a coating deposited on an elongated insulating body. In particular it can be used to check the thickness and uniformity of coatings deposited on an optical fiber.

It is well known in the art that the transmission characteristics of optical fibers deteriorate under the effect of moisture penetration into the fiber. The conventional method of preventing this type of deterioration is to deposit two superimposed coatings on the fiber; a first coating a few tens of nanometers thick made of an electrically conducting material such as carbon, and a second coating with a thickness of the order of a few tens of microns made of an insulating material such as a polymer resin. The carbon coating acts as a barrier against moisture, and the resin coating protects the carbon coating.

It is obvious that a minimum carbon coating thickness must be provided at all points if the protection of the optical fiber against moisture penetration is to be effective. It is also important that the thickness of the carbon layer varies as little as possible so that the fiber outside diameter is uniform. Diameter non-uniformities may cause stresses when an optical fiber is installed in contact with other fibers and is clamped against them, and these stresses can increase the attenuation of adjacent fibers.

For the same reasons, an attempt is made to control the resin coating.

These checks must be non-destructive of the coatings, in other words, must not require any mechanical contact between the checking apparatus and the body to be checked.

Moreover it must be possible to make these checks continuously as the carbon deposit or resin coating takes place in order to detect any anomaly immediately and to correct it as quickly as possible.

In this context, an apparatus for checking the thickness and uniformity of a conducting coating deposited on an optical fiber is known and is described in the published European patent application EP-0 395 253. This apparatus includes an RLC circuit, preferably powered by a voltage at a frequency matching its resonant frequency, and in particular this circuit contains an inductive coil placed so that the fiber passes through the coil as the fiber leaves the apparatus which deposits the conducting material. The presence of a conducting body in the coil causes losses by absorption in the circuit, which is the cause of variations of the circuit overvoltage coefficient Q.

Therefore the overvoltage coefficient Q is measured. This value is a function of the linear resistance and therefore the thickness of the deposited coating, and variations of the value are a function of the uniformity of the deposited coating.

However the apparatus proposed in EP-0 395 253 is not always satisfactory.

Firstly, it cannot be used to check the thickness of a non-conducting coating, for example resin, superimposed on the conducting coating since the presence of an insulating material in the coil does not change losses in the coil by absorption.

It also makes it necessary to use a variable condenser which complicates the electrical circuit and increases possible causes of errors.

Moreover, adjustable condensers are generally plane condensers in which the facing area of plates is varied; since this area is relatively large, variations in the relative humidity of the air have a non-negligible influence on the capacitance value of the variable condenser.

Also, the resolution of this apparatus is not very good, in other words, in practice, this apparatus cannot detect faults on a very small scale. The number of turns on the coil would have to be reduced down to only one turn, but we would be limited by the minimum wire diameter used to make this turn. In order to correct this, the apparatus would have to be used at very high frequencies, which is obviously not desirable.

One purpose of this invention is therefore to make a simple and easy to use apparatus, particularly capable of checking the thickness of a coating of a conducting material deposited on an elongated body and the thickness of a coating made of a non-conducting material superimposed on the first coating.

Another purpose of this invention is to avoid the use of an adjustable condenser in this type of apparatus.

Another purpose is to make an apparatus with a better resolution than has been possible with prior art.

This invention thus proposes an apparatus to cheek the thickness and uniformity of a coating made of an electrically conducting material deposited on an insulating elongated body, the said apparatus comprising:

a sensor sensitive to the presence of the said elongated body, and forming part of a resonant electrical circuit powered by an AC power supply voltage, with a frequency equal to the resonant frequency of the said circuit, measurement instrument to measure an electrical quantity that is a function of the thickness of the said coating of conducting material, at the output of the said circuit, equipment for processing the said electrical quantity to deduce the thickness of the said conducting material coating, wherein the said sensor consists of a condenser containing two plates separated from each other by an air gap containing a dielectric material, the said condenser being adapted to enable the said elongated body to pass through the said air gap.

This invention also includes an apparatus for checking the thickness and uniformity of an insulating material coating deposited on a conducting material coating itself deposited on an elongated insulating body, the said apparatus including:

a sensor sensitive to the presence of the said elongated body, and forming part of a resonant electrical circuit powered by an AC power supply voltage, with a frequency equal to the resonant frequency of the said circuit, measurement instrument to measure an electrical quantity that is a function of the thickness of the said coating of insulating material, at the output of the said circuit, equipment for processing the said electrical quantity to deduce the thickness of the said insulating material coating, wherein the said sensor consists of a condenser containing two plates separated from each other by an air gap containing a dielectric material, the said condenser being adapted to enable the said elongated body to pass through the said air gap.

Using a condenser as a sensor instead of an inductive coil, it is possible to check the thickness of a non-electrically conducting coating deposited on a first conducting material coating itself deposited on an elongated insulating body. Any conducting body placed inside a condenser will change its capacity. When this body has an external coating of a non-electricity conducting material, the thickness of the latter coating may be measured since the presence of the nonconducting material modifies the permittivity of the medium initially present in the condenser, and therefore the losses by absorption in the circuit to which it belongs.

Also, the frequency of the electrical circuit to which the condenser belongs can easily be matched to a required operating frequency by increasing or reducing the width of the air-gap, simply by moving the condenser plates further apart or closer to each other. This prevents the need to combine the sensor itself with an adjustable condenser with a variable capacitance, as described in patent request EP-0 395 253. This thus limits the number of constituents in the electrical circuit of the apparatus according to the invention, therefore reducing causes of possible errors.

Moreover the air gap must be as small as possible in order to provide a very fine resolution, in other words in order to be able to detect faults on a small scale. This is not a problem with a condenser, although significant problems are encountered when a coil is used as a sensor as in patent request EP-0 395 253.

It is useful if each condenser plate is tubular and cylindrical along a longitudinal axis; the plates are placed such that one plate is an extension of the other with their longitudinal axes being on the same line; the space between their adjacent edges forms the condenser air gap, and the elongated body will pass inside the condenser parallel to its longitudinal axis.

The use of a condenser with tubular cylindrical plates is much better than using a plane condenser when it is required to check the coating of an elongated cylindrical body, for example such as an optical fiber.

The sensitivity of a cylindrical condenser used to check a cylindrical body is greater than that of a plane condenser since some field lines in the plane condenser are not used if the body to be checked is cylindrical.

Another advantage of using a cylindrical condenser to check a cylindrical body is due to the fact that over a wide range the measurement made is independent of the position of the body in the condenser, in other words the distance between the center line of the body and the center line of the condenser.

Moreover, the adjacent area of facing plates in the condenser with cylindrical tubular plates is low and therefore is not very dependent on the prejudicial influence of air humidity.

According to one possible construction method, the resonant electrical circuit contains at least the previous condenser and one inductive coil mounted in series; one of the condenser plates is then connected to the ground and the other to one end of the coil. The other end of the coil is connected to a generator supplying power to the circuit through the power supply voltage, and measurement instruments are installed in parallel with the condenser to measure the voltage at each of its terminals.

In this case it will be possible to connect the inductive coil to the generator through a resistance, in order to match the electrical circuit, and the coil would then be connected to the mid-point of this resistance and of a second identical resistance connected to ground.

The circuit can also contain other passive components such as coils, condensers, resistances.

The elongated body may advantageously be either motionless in the condenser, or move along the longitudinal axis of the condenser.

According to another feature, the parameters of the coating operation may be automatically controlled to measured thickness values. This makes it possible to check coating operations and increase the thickness of the coating above a minimum tolerated threshold when necessary, or for example to restore the uniformity of the coating made.

In order to avoid external electromagnetic disturbances, the condenser may have a third cylindrical plate identical to the first two, placed such that its longitudinal axis is an extension of the axes of the other two plates; this plate is called an intermediate plate, and is separated from the other two plates by an air gap. The intermediate plate is connected to the rest of the circuit and the other plates are connected to the ground.

Finally, a metal shield may be placed around the condenser and separated from it by a dielectric material. This shielding also protects the condenser against any external electromagnetic disturbances.

The procedure for checking a coating deposited on an elongated insulating body using the apparatus according to the invention, in which the measured electrical quantity is a voltage, includes processing equipment capable of calculating the amplitude of the transfer function obtained by taking the ratio of the voltage measured by the measurement instruments and the power supply voltage. This amplitude is then compared with reference amplitudes corresponding to known thickness to deduce the thickness of the coating being checked.

According to another process for checking a coating deposited on an elongated insulating body using an apparatus according to the invention, the measured electrical quantity being a voltage, processing equipment can calculate the amplitude of the transfer function obtained by taking the ratio between the voltage measured by measurement instruments and the power supply voltage. This amplitude is then compared with previously determined lower and upper thresholds to check the uniformity of the coating.

When an attempt is made to measure the thickness of a coating of an electrically conducting material deposited on an insulating body, reference amplitudes are equal to amplitudes obtained for different samples of the same insulating body each coated with a layer of a different and known thickness of the conducting material.

When an attempt is made to measure the thickness of a coating of an insulating material deposited on a conducting coating, itself deposited on an insulating body, reference amplitudes are equal to amplitudes obtained for different samples of the same insulating body coated with a conducting material, each coated with a layer of a different and known thickness of the insulating material.

If an attempt is made to check the uniformity of an insulating material coating deposited on a conducting coating, itself deposited on an insulating body, the measured voltage is replaced in the calculation of the transfer function by the difference between the voltage measured for the body coated with the conducting material then the insulating material, and the voltage measured for the body coated with the conducting material but not coated with the insulating material, this difference being taken between two values measured on the same portion of the body, and the amplitude of this transfer function is compared with previously determined lower and upper thresholds to check the uniformity of the insulating coating.

A so-called differential measurement can be made to prevent variations of ambient conditions, for example such as temperature or humidity, from affecting the measurements made. This is done by replacing the measured voltage in the calculation of the transfer function by the difference between the voltage measured for the insulating body with a coating and the voltage measured for the insulated body without any coating. The differential measurement thus eliminates influences of the ambient environment since the apparatus through which the coated body passes and the apparatus through which the uncoated body passes are under the same conditions, in other words they are subjected to the same influences.

The apparatus according to the invention and the process using it may be applied to check a coating made of an electrically conducting material and an insulating material deposited on an insulating body. For example this body may be an optical fiber and the material may be a carbon conductor. The invention can be applied to the case of a polymer resin coating deposited on the previous carbon coating.

Other features and advantages of this invention will appear in the following description of an apparatus according to the invention and its operating method, given for illustration purposes and in no way restrictive.

In the following figures:

FIG. 2B illustrates an improvement to the previous electrical circuit, FIG. 3 schematically illustrates an installation for carbon deposition on an optical fiber followed by coating of this optical fiber with a protection resin, in which three apparatuses according to the invention are used.

Common elements in these figures have the same reference numbers.

Throughout the following, an attempt is made to describe the apparatus and the method according to the invention used to check the thickness of a carbon coating and an external polymer resin coating deposited on an optical fiber.

Figure 1A:
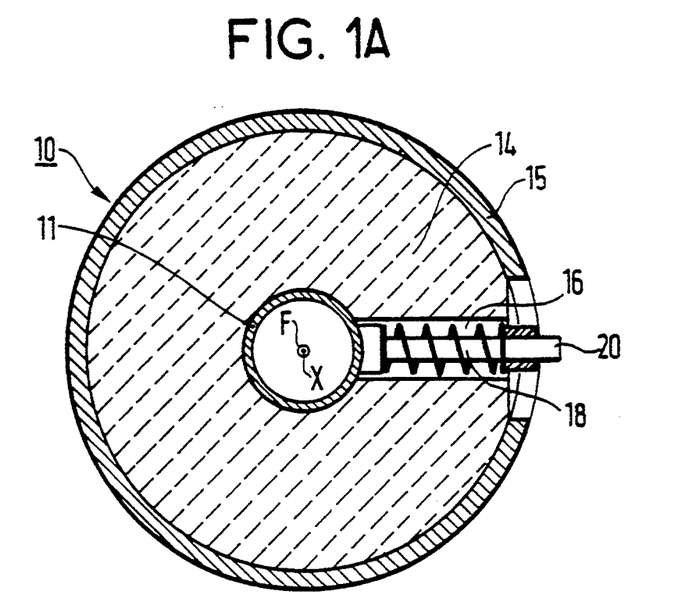
FIG. 1A shows a transverse section of a condenser used as a sensor in an apparatus according to invention.
Figure 1B:
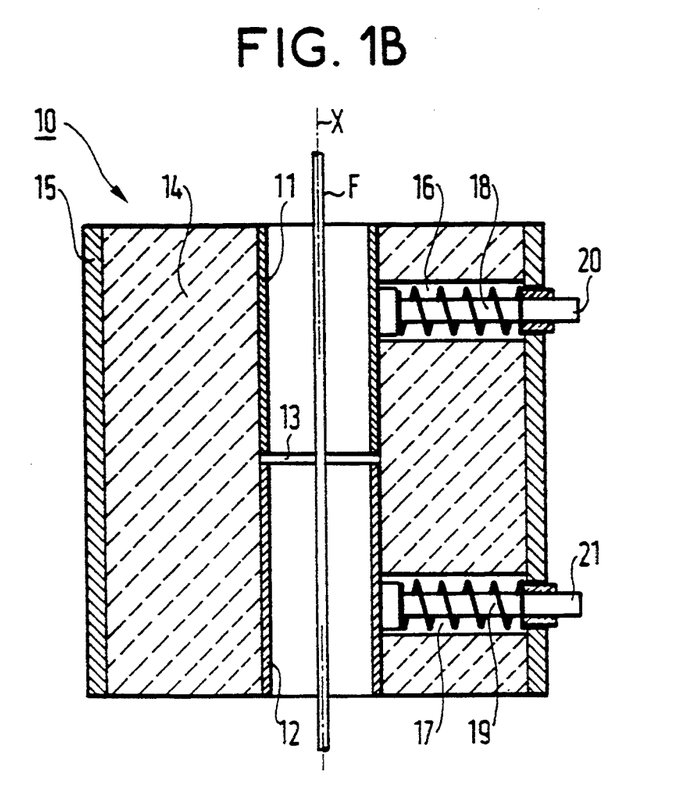
FIG. 1B shows a longitudinal section through the condenser in FIG. 1.

FIGS. 1A and 1B show a condenser 10 with two plates 11 and 12, according to the invention. Each of these plates consists of a metal cylinder with a diameter equal to 9 mm and a height equal to 25 min. The longitudinal axes of plates 11 and 12 are placed so that one is an extension of the other, thus forming the longitudinal axis X of condenser 10.

The shape used for the plates in condenser 10 is particularly desirable. When the body to be checked is cylindrical, as is the case for an optical fiber, it is preferable that the sensor is also cylindrical. For example if a cylindrical body is inserted in a plane condenser, some parts of the outside surface of this body are not facing the plates, and consequently some field lines are not used and hence the efficiency is not very good.

Plates 11 and 12 are separated from each other along the X axis by a few tenths of a millimeter (about 8 to 10 tenths), to form an air strip forming the air gap 13 of condenser 10.

In order to avoid the harmful influence on measurements of any external electromagnetic disturbances, plates 11 and 12 are placed in a cylindrical sleeve 14 made of a dielectric material, itself surrounded by a metal tube 15, made for example of aluminum, forming an electromagnetic shield. To connect plates 11 and 12 to the rest of the electrical circuit to which the condenser 10 belongs, two passages 16 and 17 are formed through sleeve 14 and tube 15 which house metal connectors 18 and 19 respectively in contact with plates 11 and 12 and leading to the outside of tube 15 to form two terminals 20 and 21 respectively.

The apparatus according to the invention is placed such that a fiber F, or any other elongated body to be checked, passes through condenser 10 parallel to its axis X. The presence of fiber F with its carbon conducting coating changes the capacity of condenser 10. We will see later how this modification affects the carbon coating thickness check.

Figure 2A:
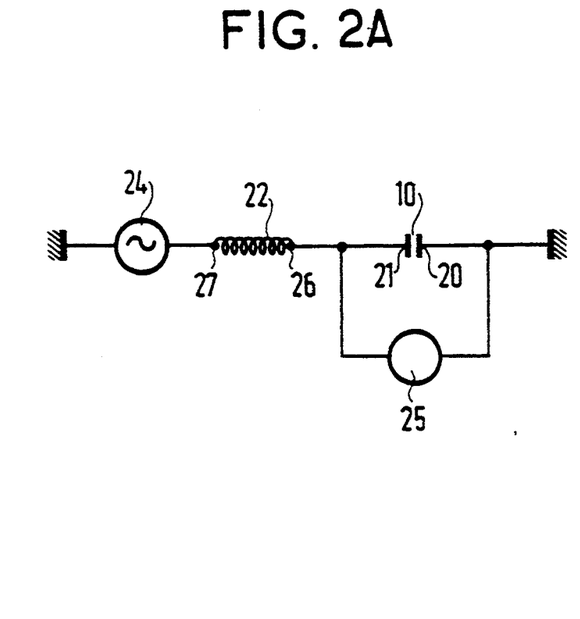
FIG. 2A shows the electrical circuit for a possible apparatus according to the invention, using the condenser in FIGS. 1A and 1B.

FIG. 2A shows the electrical circuit of an apparatus according to the invention in which the previous condenser 10 is used. Condenser 10 is mounted in series with a coil 22 (with its own resistance not shown). Terminal 20 of condenser 10 is connected to the ground, and its terminal 21 is connected to terminal 26 on coil 22. Terminal 27 on coil 22 is connected to a generator 24 providing an alternating voltage Ve with a frequency equal to the resonant frequency of the resonant circuit formed by coil 22 and condenser 10. Finally, a vectorial voltmeter (or RF detector) 25 is placed in parallel with condenser 10 measuring the voltage Vs at its terminals (in practice voltmeter 25 outputs the amplitude and phase of Vs).

Figure 2B:
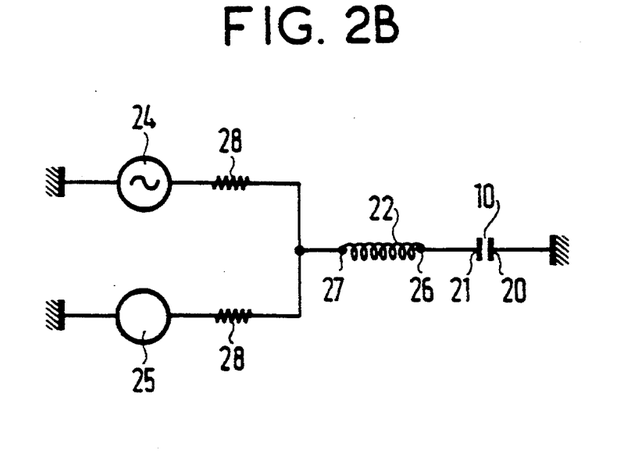

FIG. 2B shows an improvement to the previous apparatus. In this figure terminal 27 on coil 22 is connected to the mid-point of two matching resistances 28. One of the resistances 28 is connected to generator 24 that still supplies an alternating voltage Ve with a frequency equal to the resonant frequency of the resonant circuit formed by condenser 10, coil 22 and the two resistances 28. The other matching resistance 28 is connected to the voltmeter 25, itself connected to the ground. The voltmeter is therefore installed in the electrical circuit diagram in FIG. 2B in parallel with the assembly formed by condenser 10, coil 22 and one of the resistances 28, but it may also be placed in parallel with condenser 10 only. In both of these cases, the measured voltage Vs varies when fiber F moves inside condenser 10.

The check on the thickness of a coating deposited on the fiber F is based on the following principle.

An apparatus according to the invention such as that shown in FIG. 2A or 2B is installed such that fiber F is inside condenser 10 (and may either move along the X axis or remain motionless along the X axis in condenser 10). The presence of a conducting body in condenser 10 changes the capacity of the condenser and therefore increases losses by absorption in the circuit, causing variations of the measured voltage Vs that are themselves related to the quantity of conducting material present in condenser 10. This quantity is obviously a function of the thickness of the carbon coating deposited on the portion of the fiber F located inside condenser 10. By measuring the amplitude of the complex transfer function equal to the ratio between complex voltages Vs and Ve, it is possible to determine the thickness of the conducting material by means of a suitable calibration that will be described in detail in the following.

The principle used to check the thickness of an insulating coating covering the conducting coating is almost identical. The presence of an additional insulating layer in the condenser 10 changes the permittivity of the medium located in condenser 10 creating additional absorption losses in the circuit. Thus by measuring absorption losses in the circuit, the thickness of the insulating material can be deduced by a suitable calibration that will be described in detail in the following. For example absorption losses can be measured through the amplitude of the complex transfer function H equal to the ratio between the complex voltages Vs and Ve, i.e., $$H = \frac{Vs}{Ve}.$$

The advantage of using a resonant circuit lies in the fact that the resonant circuit is very sensitive to variations in the properties of its component elements (particularly the condenser in the case of the invention).

We will now describe how the apparatus according to the invention operates in more detail. An exact theoretical explanation of the physical phenomena causing losses by absorption requires that all elementary condensers created by the presence of a conducting material in the air gap 13 of condenser 10 and inside the condenser plates 11 and 12, are modelled. Modelling is not useful in practice since it is preferable to calibrate apparatuses used.

Figure 3:
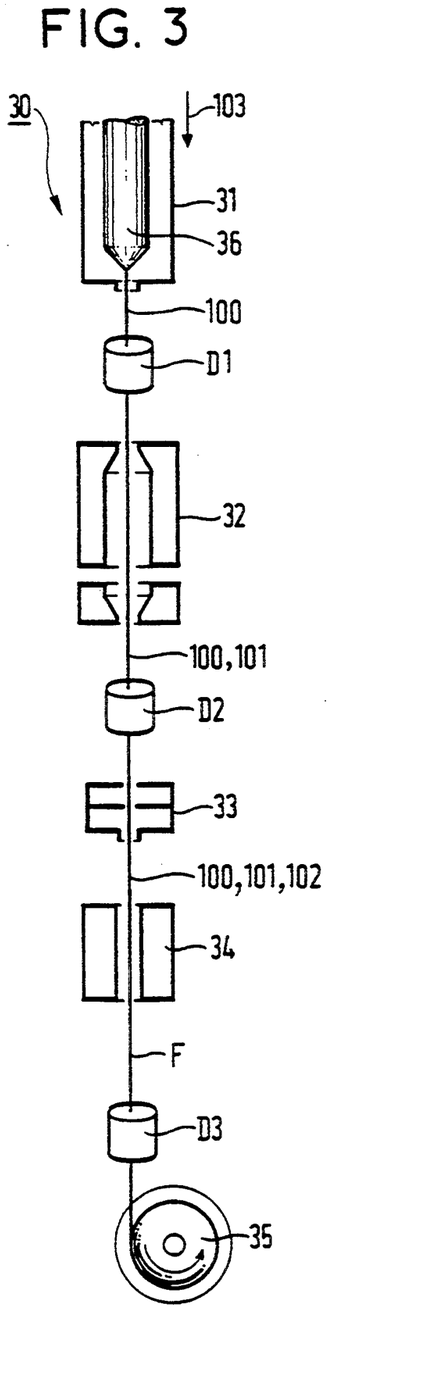

We will now describe details of operation of the apparatus according to the invention with reference to FIG. 3, together with the method of use for checking thicknesses.

FIG. 3 very schematically represents an apparatus 30 for a depositing carbon coating 101 on a bare optical fiber 100, and then applying a polymer resin coating to the first coating to form an insulating protective coating 102. The apparatus 30 includes a fiber drawing head 31 in which the temperature of a silica preform 36 is increased to its drawing temperature. At the exit from the fiber drawing head 31, the fiber 100 obtained passes through a first apparatus $D_1$ according to the invention, then into a reaction vessel 32 in which the carbon deposition is made. A second apparatus $D_2$ according to the invention is placed at the exit from the reaction vessel 32 to check the thickness of the carbon coating 101.

Fiber 100 coated with carbon then passes through a coating machine 33 that makes the polymer resin coating. On exit from the coating machine 33, the fiber passes through equipment 34 that polymerizes the resin, then through a third apparatus $D_3$ according to the invention to check the thickness of coating 102. Finally the finished fiber F is wound onto a reception reel 35.

Apparatuses $D_1$, $D_2$ and $D_3$ are strictly identical and are all powered with the same reference voltage Ve.

It is very useful to use several strictly identical apparatuses according to the invention, since the use of tubular cylindrical plate condensers makes it easy to obtain the same adjustment for each of these apparatuses since it is easy to very precisely control the width of the various air gaps (for example using micrometer screws). Therefore in this case the invention has the additional advantage of being reproducible.

Three examples will be considered below in order to better explain the process according to the invention. In the first example (Example 1), the procedure for checking the thickness of the coating 101 will be described. The method of checking the thickness of the second coating 102 will be described in the second example (Example 2). Finally the third example (Example 3) describes a checking procedure in which measurements may be made independent of the influence of the surrounding environment.

In the following, subscripts 1, 2 and 3 refer to the elements and magnitudes measured in apparatuses $D_1$, $D_2$ and $D_3$ respectively.

EXAMPLE 1

At the exit from reaction vessel 32, fiber 100 coated with carbon passes through condenser 102 in apparatus $D_2$, placed such that its longitudinal axis $X_2$ is coincident with the direction of advance of the fiber indicated by the arrow 103 in FIG. 3.

The measured voltage $Vs_2$ is then transmitted to suitable processing equipment $40_2$ (see FIG. 4) for apparatus $D_2$ according to the invention, that calculates the complex transfer function $H_2$ equal to the ratio between complex voltages $Vs_2$ and Ve, and deduces a use fill signal composed of a direct voltage that depends on the maximum amplitude $HM_2$ of $H_2$, where this function can easily be normalized, in other words it is easy to deduce $HM_2$ from it. The value of HM2 determined as above is then compared in a comparator $41_2$ with previously determined reference values stored in a processor $42_2$ controlling the various operations in the process according to the invention.

In order to determine these reference values, several fiber samples identical to fiber 100 are used, each coated with a different known thickness of carbon coating (for example these different known thicknesses may have been previously measured by measuring the linear resistance of each sample, since the linear resistance is function of the quantity of carbon present on the sample). Each of these samples is placed in turn in the condenser in an apparatus according to the invention identical to apparatuses $D_1$, $D_2$ and $D_3$, and the value of HM is determined for each of them. This then defines the correspondence between the values of HM and the values of the linear resistance of the sample, in other words the correspondence between the values of HM and the values of the thickness of the carbon coating, thus calibrating the apparatus according to the invention.

Thus the average thickness of coating 101 on the portion of fiber inside condenser $10_2$ can be deduced by comparing measured values of $HM_2$ with the reference values.

For example it is then possible to plot a curve showing the thickness of coating 101 as a function of the point on the fiber considered, and check if this thickness is above the minimum tolerated threshold. It is also possible to deduce the uniformity of coating 101 from this curve, and to check that the uniformity satisfies the required criteria, in other words for example that the difference in thickness between two points does not exceed a predetermined threshold.

There is no need to determine the thickness of coating 101 in order to check its uniformity. A curve showing $HM_2$ as a function of the point on the fiber considered can be plotted to check that the difference in thickness between two points on this curve does not exceed a given threshold.

EXAMPLE 2

On exit from equipment 34, fiber F passes through condenser $10_3$ in apparatus $D_3$, placed such that its longitudinal axis $X_3$ is coincident with the direction of 103.

Figure 4:
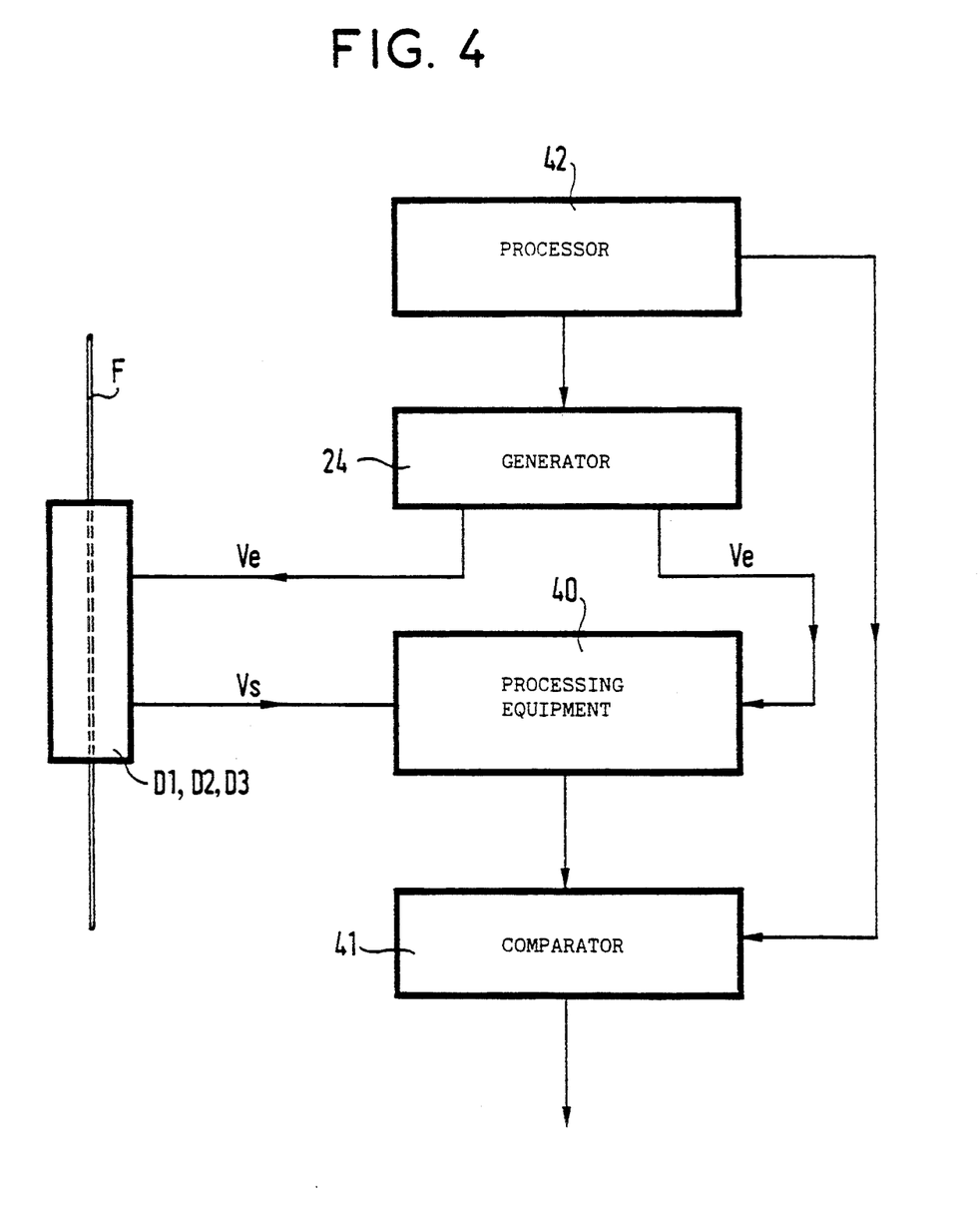
FIG. 4 shows a block diagram of the apparatus according to the invention.

The voltage $Vs_3$ is transmitted to processing equipment $40_3$ for apparatus $D_3$ that calculates a complex transfer function.

Two check methods may then be used.

According to the first method, the amplitude $HM_3$ of the complex transfer function $H_3$ calculated as the ratio between voltage $Vs_3$ measured by voltmeter $25_3$ in apparatus $D_3$ and voltage Ve, is deduced using the same method that is described in example 1.

A calibration similar to that shown in example 1 is then made, replacing the samples of bare fiber coated with different thicknesses of carbon 0 coatings by samples of bare fiber all coated with a carbon coating of the same thickness as that of the fiber to be tested, together with different and known thicknesses of resin coatings. A comparison of $HM_3$ with the reference values thus determined can be used to deduce the average thickness of coating 102 on the portion of fiber located in condenser $10_3$. In this first method, it is assumed that non-uniformities of the carbon coating on the fiber to be checked are negligible when measuring the thickness of the resin coating, such that samples with a constant thickness of carbon can be used. This assumption is valid providing that the thickness of the carbon coating is a few tens (about 8 to 10 tens) of nanometers, meaning that differences in the thickness of the carbon coating cannot exceed more than a few nanometers, whereas the thickness of the resin coating is of the order of a few microns.

In a second method, another transfer function $H'_3$ can be calculated in which $Vs_3$ is replaced by the difference between $Vs_3$ and the measured voltage for the fiber coated with carbon alone. In order to take account of the spatial difference between the measurement of $Vs_2$ and of $Vs_3$, a time phase shift of $Vs_2$ is made (to obtain a value $Vs'_2$) before subtracting this value from the value of $Vs_3$. This is necessary to use measured voltages applicable to the same portion of the fiber.

This second method eliminates the influence of any non-uniformities of the carbon coating on the check of the thickness of the resin coating.

Variations in the amplitude $HM'_3$ of the transfer function $H'_3$ are then used to check the uniformity of coating 102.

EXAMPLE 3

Apparatuses $D_2$ and $D_3$ used are subjected to the influence of variations in ambient conditions which can significantly change the measured values. The dielectric constant of the material forming the air gap (in this case air) varies considerably with the relative humidity of the ambient environment. A differential measurement can be made to overcome this disadvantage.

This is equivalent to replacing voltages $Vs_2$ or $Vs_3$, or the difference $Vs_3 - Vs'_2$ in the transfer function calculations previously described above, by the differences $Vs_2 - Vs_1$, $Vs_3 - Vs_1$ or $Vs_3 - Vs'_2 - Vs_1$, respectively. The voltage $Vs_1$ corresponds to the "no load" voltage of apparatuses $D_2$ and $D_3$ since the fiber passing through $D_1$ is bare. Since apparatuses $D_1$, $D_2$ and $D_3$ are subjected to the same ambient conditions. The method described above can eliminate the influence of external disturbances by difference.

The results are then used in the same way as in the previous two examples.

The values of the thicknesses of coatings checked according to the invention can be used to modify some parameters controlling the carbon deposition reaction vessel 32 or coating machine 33, particularly if these thicknesses exceed previously determined thresholds.

Figure 5:
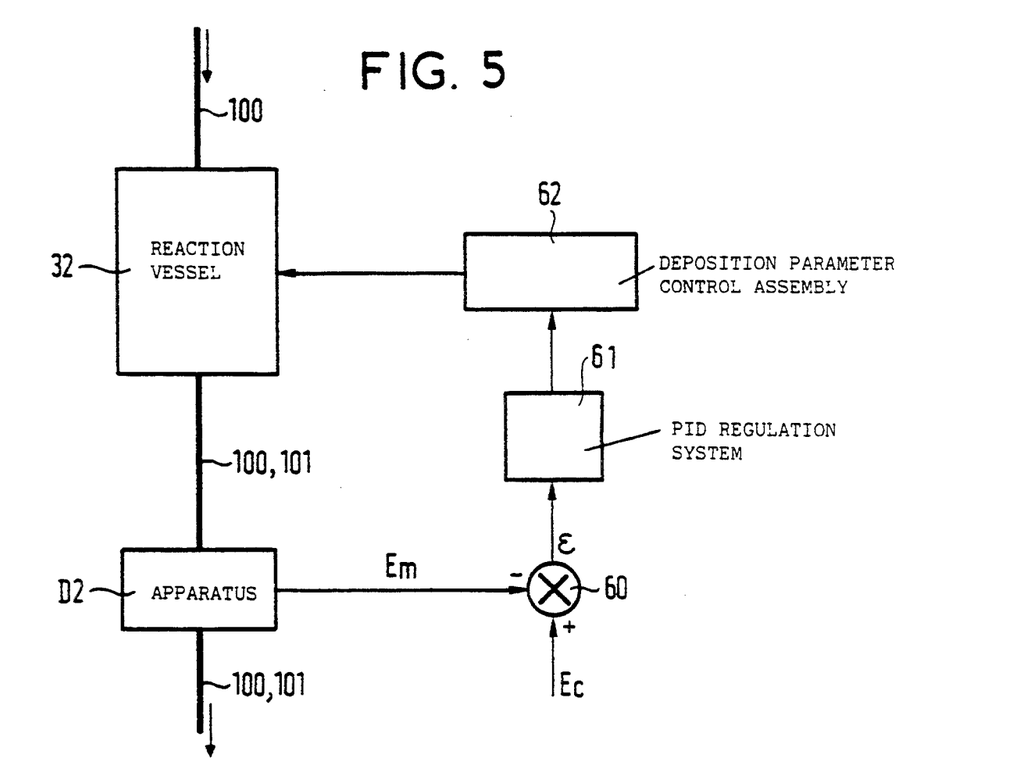
FIG. 5 is a block diagram of a servocontrol system for a reaction vessel for carbon deposition on an optical fiber using properties measured by apparatus $D_2$ in FIG. 3.

FIG. 5 shows a very simplified block diagram of how parameters of reaction vessels 32 are servocontrolled using measured values of the thickness of coating 101.

FIG. 5 shows the portion of the apparatus 30 containing reaction vessel 32 and apparatus $D_2$ through which fiber 100 passes coated with carbon. The value Em of the coating thickness 101 determined during each measurement period is subtracted by subtracter 60 from a set value Ec of the required thickness The difference obtained is transmitted to a PID regulation system 61, that outputs a control instruction to a deposition parameter control assembly 62. Thus the apparatus according to the invention can almost immediately correct any anomaly in the deposition process.

Similarly, operation parameters of coating machine 33 can be servocontrolled to values of the coating thickness 102 determined according to the invention.

Moreover, as we have previously mentioned, the apparatus according to the invention may be used either to check a moving fiber, or to check a motionless fiber in condenser 10.

When the check is made on a moving fiber, the pass band of the measurement instrument has to be adapted in order to obtain the required sensitivity (or resolution). In practice, the maximum value of the measurement instrument passband is equal to the ratio between the fiber advance speed and the width of the air gap. The resolution of the measurement made is only dependent on the width of the air gap. However it is obvious that the electronic measurement acquisition and processing equipment also has a pass band that may be narrower than the pass band of the measurement instrument. In this case the pass band is the pass band of the overall measurement instrument and limits the fiber advance speed.

Figure 7:
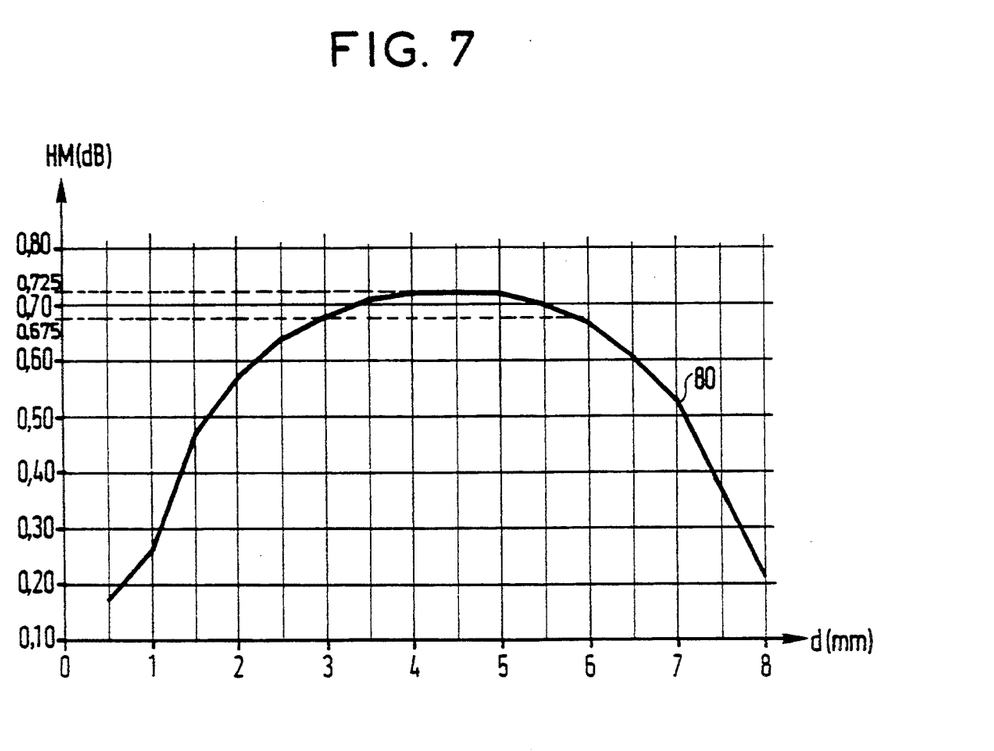

Finally the measurement made is independent of the position of the body in the condenser within a wide range. Curve 80 in FIG. 7 illustrates this phenomenon. This curve is obtained by calculating the amplitude of the transfer function for a motionless fiber coated with carbon in the condenser of an apparatus according to the invention, this fiber being placed in the condenser at different positions located in the same diametral plane of the condenser and represented by the distance of the axis of the fiber from one of the ends of the condenser diameter. Curve 80 therefore represents HM (in dB) as a function of this distance d (in mm), the condenser diameter being 9 mm. For analysis, it is assumed that the exact measurement is given when the axis of the fiber is coincident with the axis of the condenser, which is the most probable assumption.

If we accept an error of 0.05 dB on the measurement, which gives a perfectly acceptable precision, it is seen that a lateral displacement of the fiber with an amplitude of about 1.5 mm on each side of the condenser axis, can be tolerated during the measurement. This property is particularly interesting if the apparatus according to the invention is used on an optical fiber production, deposition and coating line in which this type of displacement cannot be avoided.

Obviously, the invention is not restricted to the construction method described above.

Figure 6:
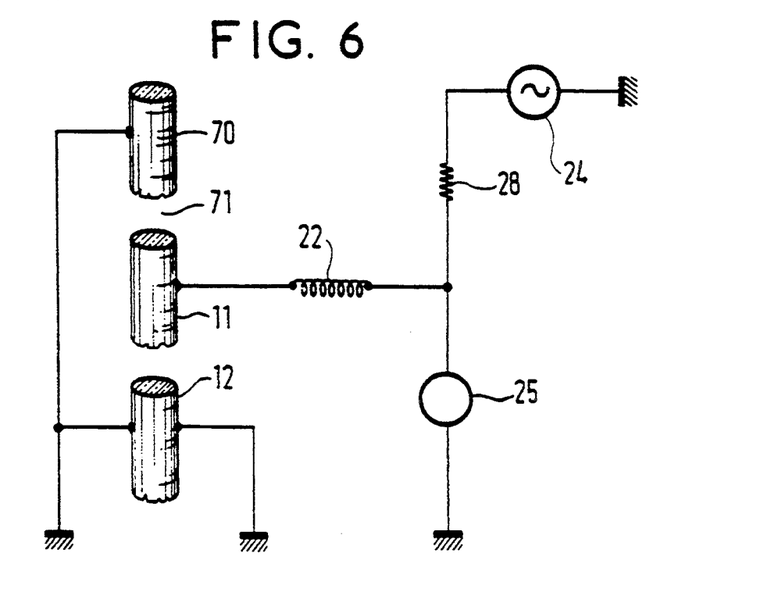
FIG. 6 is an electrical diagram of an improvement on the condenser used in an apparatus according to the invention, FIG. 7 gives the processing equipment output signal as a function of the position of the body to be checked in the condenser.

In particular, the condenser acting as a sensor can be further protected against external electromagnetic disturbances. This improvement is shown in FIG. 6. In order to provide the same protection against electromagnetic disturbances for the plate connected to the ground and for the plate that is not connected to the ground, a third plate 70 is provided identical to plates 11 and 12 in extension to the plate that is not connected to the ground, for example plate 11, with an air gap 71 between the two plates. Plates 70 and 12 are both connected to the ground, and plate 11 is electrically connected to the rest of the apparatus. As in the case of condenser 10, the set of three plates 11, 12 and 70 is protected by a dielectric sleeve (not shown) and by a metal tube (not shown) and passages (not shown) are made in the sleeve and metal tube in order to make the necessary electrical connections. As a result of this improvement, the apparatus according to the invention is practically unaffected by external electromagnetic disturbances.

Moreover, there is no need to use an apparatus such as D1 placed on the trajectory of the bare fiber for the differential measurement. For example, this apparatus could be replaced by an independent apparatus in which a motionless bare fiber identical to the manufactured fiber is placed. This can sometimes facilitate the measurements.

We have also considered the case of an LC circuit as a preferred example of a resonant circuit for the apparatus according to the invention. However any resonant circuit containing at least one condenser and an inductive coil will be suitable for use in the invention.

It is also possible to measure the circuit overvoltage factor instead of measuring the voltage Vs in order to determine the thickness or uniformity of the coating to be checked.

Obviously the invention may be applied to any other elongated body than an optical fiber. For example, it may be used, non-restrictively, to check a metal coating deposited on a nylon thread.

Finally, any device may be replaced by an equivalent device and still remain within the scope of the invention.

We claim:

1. An apparatus for checking the thickness and uniformity of a coating of a conducting material deposited on an elongated insulating body, said apparatus comprising:

a resonant electrical circuit having a resonant frequency and being powered by an alternating voltage referred to as the power supply voltage at a frequency equal to the resonant frequency of said circuit, a sensor sensitive to the presence of said elongated body and forming a part of said resonant electrical circuit, means for measuring an electrical quantity that is a function of the thickness of said coating of conducting material, said measuring means being connected to an output of said circuit, and means coupled to said measuring means for processing said electrical quantity to deduce the thickness of said coating of conducting material[, and]:

wherein:

said sensor consists of a condenser (10) having a longitudinal axis X and comprising two plates separated from each other by a gap containing a dielectric material, said condenser being configured to permit said elongated body to pass across said gap between said plates;

each of said plates (11, 12) is tubular and cylindrical around said longitudinal axis X;

said plates are placed such that they form an extension of each other and have a common longitudinal axis which is coincident with the longitudinal axis X of the condenser; and a space between facing edges of said plates forms said gap (13) of said condenser (10), such that said elongated body (F) extends through said condenser (10) in a direction parallel to the longitudinal axis X of said condenser.

2. Apparatus according to claim 1, wherein said electrical circuit contains at least said condenser (10) and an inductive coil (22) in series, one of said plates being connected to ground, another of said plates being connected to an end of said coil (22), another end of said coil (22) being connected to a generator (24) for providing said power supply voltage, and said measuring means (25) being installed in parallel with said condenser (10) to measure the voltage at terminals of said measuring means.

3. The apparatus according to claim 2, further comprising first and second identical resistances connected together at a midpoint therebetween, wherein said coil (22) is connected to said generator (24) through said first resistance, said coil (22) being connected to said mid-point, and said second resistance being connected to ground, whereby said resistances are used to match said circuit.

4. Apparatus according to claim 2, wherein said condenser contains a third cylindrical plate (70) identical to said first and second plates (11, 12), said third cylindrical plate (70) being placed such that a longitudinal axis thereof is an extension of axes of said first two plates and coaxial with the axis X of said condenser and being separated from one of said two plates called an intermediate plate (11) by a gap (71), and wherein said intermediate plate (11) is connected to said circuit and said second and third plates (12, 70) are connected to ground.

5. Apparatus according to claim 1, wherein said elongated body (F) is motionless in said condenser (10).

6. Apparatus according to claim 1, wherein said elongated body (F) is movable along the longitudinal axis of said elongated body (F) inside said condenser (10).

7. The apparatus according to claim 1, further comprising means for automatically controlling the parameters of the deposition of said coating, including means for comparing measured thickness values to a set value of required thickness.

8. Apparatus according to claim 1, further comprising a metal shield (15) placed around said condenser and being separated from said condenser plates by a dielectric material (14).

9. An apparatus for checking the thickness and uniformity of a coating of insulating material deposited on a coating of conducting material in turn deposited on an elongated insulating body, said apparatus comprising:
  a resonant electrical circuit having a resonant frequency and being powered by an alternating voltage referred to as the power supply voltage at a frequency equal to the resonant frequency of said circuit, a sensor sensitive to the presence of the elongated body and forming part of said resonant electrical circuit,
  means for measuring an electrical quantity that is a function of the thickness of said coating of insulating material, said measuring means being coupled to an output of said circuit, and
  means for processing said electrical quantity to deduce the thickness of said coating of insulating material;
  wherein:
  said sensor consists of a condenser (10) having a longitudinal axis X and comprising two plates separated from each other by a gap containing a dielectric material, said condenser being configured to permit said elongated body to pass across said gap and between said plates;
  each of said plates (11, 12) is tubular and cylindrical around said longitudinal axis X;
  said plates are placed such that they form an extension of each other and have a common longitudinal axis which is coincident with the longitudinal axis X of the condenser: and
  a space between facing edges of said plates forms said gap (13) of said condenser (10), such that said elongated body (F) extends through said condenser (10) in a direction parallel to the longitudinal axis X of said condenser.

10. Apparatus according to claim 9, wherein said electrical circuit contains at least said condenser (10) and an inductive coil (22) in series, one of said plates being connected to ground, another of said plates being connected to an end of said coil (22), another end of said coil (22) being connected to a generator (24) for providing said power supply voltage, and said measuring means (25) being installed in parallel with said condenser (10) to measure the voltage at terminals of said measuring means.

11. The apparatus according to claim 9, further comprising means for automatically controlling the parameters of the deposition of said coating, including means for comparing measured thickness values to a set value of required thickness.

12. A process for checking the uniformity of a coating deposited on an elongated insulating body, using an apparatus comprising: a resonant electrical circuit having a resonant frequency and being powered by an alternating voltage referred to as the power supply voltage and having a frequency equal to the resonant frequency of said circuit; a sensor sensitive to the presence of said elongated body and forming part of said resonant electrical circuit means connected to an output of said circuit, for measuring an electrical quantity that is a function of the thickness of said coating being checked and means coupled to said measuring means for processing said electrical quantity to deduce the thickness of said coating; wherein: said sensor consists of a condenser (10) having a longitudinal axis X and comprising two plates separated from each other by a gap containing a dielectric material, said condenser being configured to permit said elongated body to pass across said gap and between said plates, each of said plates (11, 12) is tubular and cylindrical around said longitudinal axis X; said plates are placed such that they form an extension of each other and have a common longitudinal axis which is coincident with the longitudinal axis X of the condenser, and a space between facing edges of said plates forms said gap (13) of said condenser (10), such that said elongated body (F) extends through said condenser (10) in a direction parallel to the longitudinal axis X of said condenser; and said electrical quantity is a voltage;
  said process comprising the steps of:
  calculating an amplitude of a transfer function obtained by taking the ratio between the voltage measured by said measuring means and said power supply voltage; and
  comparing the amplitude with previously determined upper and lower thresholds to check the uniformity of the thickness of said coating.

13. The process according to claim 12, wherein said coating to be checked is a coating of an electrically conducting material deposited on the insulating body, and said step of comparing said amplitude with reference amplitudes comprises comparing reference amplitudes corresponding to amplitudes obtained for different samples of said insulating body, each sample being coated with a coating of a different and known thickness of said conducting material.

14. The process according to claim 12, wherein said coating to be checked is a coating of an insulating material deposited on a conducting material which, in turn, is deposited on the insulating body, and said step of comparing said reference amplitudes comprises comparing reference amplitudes corresponding to amplitudes obtained for different samples of said insulating body which are coated with conducting material, each sample being coated with a coating of a different and known thickness of the insulating material.

15. The process according to claim 12, wherein said coating to be checked is a coating of an insulating material deposited on a coating of conducting material which, in turn, is deposited on the insulating body, and wherein in the calculation of said transfer function said measured voltage is replaced by the difference between (1) said measured voltage for said insulating body coated by the conducting material and by said insulating material, and (2) the measured voltage for said insulating body coated by said conducting material but not coated by said insulating material, wherein the amplitude of the new transfer function is compared with previously determined lower and upper thresholds to check the uniformity of said insulating coating.

16. Process according to claim 12 for calculating the amplitude of the transfer function, wherein the measured voltage is replaced by the difference between the measured voltage for the coated insulating body and the measured voltage for the insulating body without any coating.

17. The process according to claim 12, wherein said step of calculating the amplitude of the transfer function is applied to an electrically conducting material deposited on an optical fiber.

18. The process according to claim 17, wherein said electrically conducting material is carbon.

19. The process according to claim 17, wherein a polymer resin coating covers said coating of an electrically conducting material.

20. An installation for manufacture of an elongated body coated with an electrically conductive material and an insulating material, comprising:
first means (32) through which said body (100) passes for depositing a conducting material (101) on said elongated body,
second means (33, 34) through which said body advances for coating said elongated body (100), covered with a conducting material (101), with a layer of insulating material (102), and
first and second identical checking apparatuses (D$_2$, D$_3$), each of said identical checking apparatuses comprising:
a resonant electrical circuit having a resonant frequency and being powered by an alternating voltage referred to as the power supply voltage at a frequency equal to the resonant frequency of said circuit,
a sensor sensitive to the presence of said elongated body and forming part of said resonant electrical circuit,
means, connected to an output of said circuit, for measuring an electrical quantity that is a function of the thickness of said coating of conducting material, and
means coupled to said measuring means for processing said electrical quantity to deduce the thickness of said coating thereon;
wherein; said sensor consists of a condenser (10) having a longitudinal axis X and two plates separated from each other by a gap containing a dielectric material, said condenser being configured to permit said elongated body to pass across said gap and between said plates each of said plates (11, 12) is tubular and cylindrical around said longitudinal axis X; said plates are placed such that they form an extension of each other and have a common longitudinal axis which is coincident with the longitudinal axis X of the condenser; and a space between facing edges of said plates forms said gap (13) of said condenser (10), such that said elongated body (F) extends through said condenser (10) in a direction parallel to the longitudinal axis X of said condenser;
said installation further comprising:
means for passing said elongated body (F) through the first checking apparatus (D$_2$) at an exit from said first means (32); and
means for passing said elongated body (F) through the second apparatus (D$_3$) at an exit from said second means (33, 34).

21. The installation according to claim 20, further comprising a third checking apparatus (D$_1$), identical to said first and second checking apparatuses, and means for passing said elongated body (100) through said third checking apparatus before passing said body through said first means (32).

22. Installation according to claim 20, wherein said elongated body is an optical fiber, said first means is placed at an exit from a fiber drawing oven, and said second means coats said fiber covered with the conducting material, with a polymerizable resin and polymerizes said resin.

* * * * *